(12) United States Patent
Schlitter et al.

(10) Patent No.: US 7,544,766 B2
(45) Date of Patent: Jun. 9, 2009

(54) METHOD FOR THE POLYMERIZATION OF CYCLIC ETHERS

(75) Inventors: Stephan Schlitter, Limburgerhof (DE); Martin Haubner, Eppelheim (DE); Peter Zehner, Ludwigshafen (DE); Michael Hesse, Worms (DE); Alexander Weck, Freinsheim (DE); Rolf Pinkos, Bad Dürkheim (DE); Thomas Graßler, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 224 days.

(21) Appl. No.: 10/540,510

(22) PCT Filed: Dec. 23, 2003

(86) PCT No.: PCT/EP03/14790

§ 371 (c)(1),
(2), (4) Date: Jan. 20, 2006

(87) PCT Pub. No.: WO2004/058855

PCT Pub. Date: Jul. 15, 2004

(65) Prior Publication Data

US 2006/0142543 A1    Jun. 29, 2006

(30) Foreign Application Priority Data

Dec. 23, 2002   (DE)   ............................. 102 61 484

(51) Int. Cl.
| C08G 59/00 | (2006.01) |
| C08G 65/00 | (2006.01) |
| C08G 65/04 | (2006.01) |
| C08G 65/06 | (2006.01) |
| C08G 65/10 | (2006.01) |
| C08G 65/16 | (2006.01) |
| C08G 65/20 | (2006.01) |
| C08G 59/68 | (2006.01) |
| C08F 2/01 | (2006.01) |
| C07C 43/04 | (2006.01) |

(52) U.S. Cl. .................... 528/408; 528/403; 528/425; 528/410; 528/411; 528/417; 526/69; 502/254; 502/309; 568/617

(58) Field of Classification Search ............... 528/403, 528/408, 417, 425, 410, 411; 526/69; 568/617; 549/429; 502/254, 309
See application file for complete search history.

(56) References Cited

U.S. PATENT DOCUMENTS

| 3,433,829 A | 3/1969 | Döfelt | |
| 3,723,395 A * | 3/1973 | Warzell | ........................ 526/65 |
| 4,120,903 A | 10/1978 | Pruckmayr et al. | |
| 4,163,115 A | 7/1979 | Heinsohn et al. | |
| 4,228,272 A | 10/1980 | Del Pesco | |
| 4,470,931 A * | 9/1984 | Callahan et al. | ............. 558/324 |
| 4,564,671 A * | 1/1986 | Mueller | ...................... 528/416 |
| 4,579,599 A * | 4/1986 | Takeda | ....................... 134/25.1 |
| 4,658,065 A | 4/1987 | Aoshima et al. | |
| 5,136,106 A | 8/1992 | King | |
| 5,208,385 A | 5/1993 | Kahn et al. | |
| 5,641,857 A | 6/1997 | Dostalek et al. | |
| 5,773,648 A | 6/1998 | Becker et al. | |
| 5,886,138 A * | 3/1999 | Muller | ....................... 528/408 |
| 6,036,845 A * | 3/2000 | Funk et al. | ..................... 208/65 |
| 6,043,338 A * | 3/2000 | Sigwart et al. | ............. 528/405 |
| 6,313,262 B1 | 11/2001 | Chen et al. | |
| 6,362,312 B1 | 3/2002 | Eller et al. | |
| 6,455,711 B1 | 9/2002 | Eller et al. | |
| 6,716,937 B2 | 4/2004 | Bohner et al. | |
| 6,870,014 B2 * | 3/2005 | Steinbrenner et al. | ......... 526/90 |
| 6,977,046 B2 * | 12/2005 | Hubbuch et al. | ............ 210/656 |
| 2002/0165340 A1 * | 11/2002 | Yoneda et al. | ............. 528/408 |
| 2004/0220381 A1 | 11/2004 | Schlitter et al. | |

FOREIGN PATENT DOCUMENTS

| DE | 1 226 560 | 10/1966 |
| DE | 28 01 578 | 7/1979 |
| DE | 29 16 653 | 11/1980 |
| DE | 43 16 138 | 11/1994 |
| DE | 44 33 606 | 3/1996 |
| DE | 195 13 493 | 3/1996 |
| DE | 100 32 266 | 1/2002 |
| JP | 04-306228 | 10/1992 |
| JP | 11-292958 | 10/1999 |
| JP | 2001-220439 | 8/2001 |
| WO | WO-94/05719 | 3/1994 |
| WO | WO-96/23833 | 8/1996 |
| WO | WO-98/51729 | 11/1998 |
| WO | WO-99/12992 | 3/1999 |
| WO | WO 9936459 A1 * | 7/1999 |
| WO | WO-03/002631 | 1/2003 |

OTHER PUBLICATIONS

Tonsil Optimum FF Technical Data Sheets, Sud-Chemie, Munich, copyright 2007.*

* cited by examiner

*Primary Examiner*—Mark Eashoo
*Assistant Examiner*—Michael Pepitone
(74) *Attorney, Agent, or Firm*—Connolly Bove Lodge & Hutz LLP

(57) ABSTRACT

The present invention relates to a process for preparing polytetrahydrofuran, polytetrahydrofuran copolymer, diester or monoester by polymerizing tetrahydrofuran in the presence of at least one telogen and/or comonomer and of an acidic heterogeneous catalyst based on activated sheet silicates or mixed metal oxides in a fluidized bed.

18 Claims, No Drawings

METHOD FOR THE POLYMERIZATION OF CYCLIC ETHERS

CROSS REFERENCE TO RELATED APPLICATION

The present application is a National Stage application of PCT/EP2003/014790, filed Dec. 23, 2003, which claims priority from German Patent Application No. DE 102 61 484.9, filed Dec. 23, 2002.

The present invention relates to a process for ring-opening polymerization of cyclic ethers, in particular of tetrahydrofuran and tetrahydrofuran derivatives, in the presence of a heterogeneous inorganic catalyst, preferably based on activated sheet silicates or mixed metal oxides. The catalyst is arranged as a fluidized bed.

Polytetrahydrofuran (referred to hereinbelow as "PTHF"), also referred to as polyoxybutylene glycol, is a versatile intermediate in the plastics and synthetic fibers industry and is used, inter alia, as a diol component for preparing polyurethane, polyester and polyamide elastomers. In addition, like some of its derivatives, it is a valuable assistant in many applications, e.g. as a dispersant or in the deinking of waste paper.

PTHF is industrially prepared typically by polymerizing tetrahydrofuran (referred to hereinbelow as "THF") over suitable catalysts, and a distinction is drawn between the one-stage and the two-stage process. It is synthesized in the presence of reagents whose addition permits the control of the polymer chain length and thus the control of the average molecular weight (chain terminating reagents or "telogens"). The control is effected by choosing the type and amount of the telogen. The choice of suitable telogens allows additional functional groups to be introduced at one end or both ends of the polymer chain.

For example, the mono- of diesters of PTHF may be prepared, for example, by using carboxylic acids or carboxylic anhydrides as telogens. PTHF itself is not formed until subsequent hydrolysis or transesterification. This preparation is therefore referred to as a two-stage PTHF process.

Other telogens do not only function as chain terminating reagents, but are also incorporated into the growing PTHF polymer chain. They do not only have the function of a telogen, but are also at the same time a comonomer. Examples of such comonomers/telogens include compounds having two hydroxyl groups, preferably dialcohols. These may be, for example, ethylene glycol, propylene glycol, butylene glycol, 1,3-propanediol, 1,4-butanediol, 2-butyne-1,4-diol, 2,2-dimethyl-1,3-propanediol, 1,6-hexanediol or low molecular weight PTHF.

Further suitable comonomers are cyclic ethers, preferably three-, four- and five-membered rings, such as 1,2-alkylene oxides, e.g. ethylene oxide or propylene oxide, oxetane, substituted oxetanes such as 3,3-dimethyloxetane, and also THF derivatives, e.g. 3-methyltetrahydrofuran, 3,3-dimethyltetrahydrofuran or 3,4-dimethyltetrahydrofuran.

With the exception of water, 1,4-butanediol and low molecular weight PTHF, the use of such comonomers/telogens leads to the preparation of tetrahydrofuran copolymers, referred to hereinbelow as THF copolymers, and in this way makes it possible to chemically modify PTHF.

PTHF can be industrially prepared by THF polymerization with water, 1,4-butanediol or low molecular weight PTHF as a telogen over acidic catalysts. Useful catalysts are both homogeneous systems dissolved in the reaction system and heterogeneous, i.e. substantially undissolved, systems. However, a disadvantage is the relatively low THF conversions which are achieved in particular in the synthesis of PTHF of molecular weight from 650 to 3000.

On the industrial scale, the abovementioned two-stage processes are predominantly carried out, in which THF, frequently in the presence of acidic catalysts, is initially polymerized to give the corresponding polytetrahydrofuran esters and subsequently hydrolyzed to give PTHF. Typically, this form of THF polymerization achieves higher THF conversions than one-stage processes. Frequently, the conversion is effected in the presence of fluorosulfonic acid as a catalyst. In particular, THF polymerization in the presence of acidic catalysts with the addition of carboxylic anhydrides is advantageous. For example, acetic anhydride is used to obtain PTHF diacetates and the subsequent transesterification of these diacetates with methanol provides PTHF and methyl acetate as a by-product. The transesterification is preferably base-catalyzed.

The preparation of PTHF by THF polymerization in the presence of carboxylic anhydrides, water, 1,4-butanediol and/or low molecular weight PTHF, and the analogous preparation of THF copolymers using cyclic ethers as comonomers over solid acidic catalysts is known.

Catalysts based on bleaching earths are described, for example, in DE-A 12 26 560.

Catalysts based on mixed metal oxides for the polymerization of THF are also known. For instance, JP-A 04-306228 discloses the polymerization of THF in the presence of a carboxylic anhydride over a mixed metal oxide consisting of metal oxides of the formula $M_xO_y$, where x and y are integers in the range from 1 to 3. Examples given are $Al_2O_3$—$SiO_2$, $SiO_2$—$TiO_2$, $SiO_2$—$ZrO_2$ and $TiO_2$—$ZrO_2$.

U.S. Pat. No. 5,208,385 discloses catalysts based on amorphous silicon/aluminum mixed oxides. Mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$ are known. The abovementioned catalysts are preferably prepared by coprecipitation/sol gel methods.

DE-A 44 336 06 discloses supported catalysts comprising tungsten oxide or molybdenum oxide applied to, for example, $ZrO_2$, $TiO_2$, $HfO_2$, $Y_2O_3$, $Fe_2O_3$, $Al_2O_3$, $SnO_2$, $SiO_2$ or $ZnO$. $ZrO_2/SiO_2$ catalysts in which the support has an alkali metal concentration of <5000 ppm are also recommended.

U.S. Pat. No. 4,120,903 describes catalysts based on acidic ion exchangers, in particular alpha-fluorosulfonic acid-containing polymers (for example Nafion®) for the polymerization of THF in the presence of acetic anhydride. Catalysts which comprise a metal and perfluoroalkylsulfonic acid anions are also suitable for THF polymerization.

In addition, known polymerization catalysts also include other optionally activated clay minerals, disclosed, for example, in WO 94/05719, WO 96/23833, WO 98/51729, WO 99/12992 and DE-A 195 13 493. Zeolites are also suitable as catalysts and are described, for example, in DE-A 43 16 138. Finally, sulfated zirconium oxides, sulfated aluminum oxides, supported heteropolyacids and supported ammonium bifluoride ($NH_4F.HF$ or antimony pentafluoride) are known to be suitable polymerization catalysts.

In addition, the prior art describes different variants of using the catalyst.

DE-A-28 01 578 describes a process for preparing PTHF diacetates from THF in the presence of carboxylic anhydrides and a bleaching earth having a water content of <3% by weight as a catalyst. DE-A-29 16 653 describes a corresponding process over shaped catalyst bodies which are arranged in a fixed bed.

U.S. Pat. No. 4,163,115 describes the preparation of PTHF over perfluorinated acidic ion exchange resins as catalysts.

The description also mentions the possibility of suspending the catalyst through the feed stream.

JP-A2 11292958 describes a continuous process for preparing PTHF in the presence of acetic anhydride, in which the catalyst is used in suspension and continuously filtered off; catalysts described in the examples are bleaching earths and mixed metal oxides of the zirconium oxide on silicon dioxide type. JP-A2-2001220439 discloses particularly suitable filtration apparatus for this procedure.

U.S. Pat. No. 4,228,272 describes a process for preparing PTHF copolymers in a suspension method. A useful catalyst is acid-activated montmorillonite, the reaction is carried out in stirred tanks and the catalyst present in suspension is retained by filters or sieves in the reactor.

DE-A 100 32 266 describes a process for one-stage preparation of PTHF in the presence of acidic heterogeneous catalysts. Preference is given to carrying out the process in a fixed bed method.

U.S. Pat. No. 4,658,065 discloses a one-stage process for preparing polyether polyols (referred to, inter alia, as PTHF copolymers) over heteropolyacids as catalysts. Preference is given to carrying out the reaction in a system composed of a plurality of liquid phases. It is also mentioned that supported heteropolyacids (the support being, for example, activated carbon) may be used in a fixed or fluidized bed reactor.

In U.S. Pat. No. 6,313,262 PTHF is prepared in one stage over mixtures of heteropolyacids and inorganic oxides. In the claims, the polymerization in a fixed bed, fluidized bed or in a stirred reactor is claimed. This is not supported by the description which only mentions fixed beds and stirred reactors.

In the prior art processes, when carrying out prior art processes in fixed bed reactors, very large reactor capacities and/or very long reaction times generally have to be accepted, since the productivity of shaped catalyst bodies is relatively low. In addition, the exchange of used catalysts is associated with considerable cost and inconvenience and entails long shutdown times.

In order to utilize the activity of the catalysts as efficiently as possible, small catalyst particles down to powders are also used, which are suspended in the reaction medium. However, the removal of the catalyst from the reaction medium in this case is technically highly demanding.

However, the economic viability of a heterogeneously catalyzed process for polymerizing cyclic ethers, in particular THF, depends decisively on the productivity of the catalyst, its easy removability from the reaction medium and a high plant availability.

It is an object of the present invention to provide a process for polymerizing cyclic ethers, in particular THF, which facilitates the simple preparation of the corresponding polyoxyalkylene glycols and avoids the disadvantages of the prior art processes. It is particularly desirable to make possible a high space-time yield with simple catalyst removal and simple catalyst exchange. In particular, the process should allow the preparation of polytetrahydrofuran and also polytetrahydrofuran copolymers, diesters or monoesters.

We have found that this object is achieved by a process for preparing polytetrahydrofuran, polytetrahydrofuran copolymer, diester or monoester by polymerizing tetrahydrofuran in the presence of at least one telogen and/or comonomer and of an acidic heterogeneous catalyst based on activated sheet silicates or mixed metal oxides in a fluidized bed According to the invention, the catalyst particles are preferably fluidized in a certain manner by being flowed through with reaction medium.

In one embodiment of the invention, the fluidization is carried out in such a way that formation of an expanded liquid-solid fluidized bed is achieved. This is accompanied by a distinct expansion of the catalyst bed, a corresponding increase in the space between the catalyst particles and distinct backmixing of the catalyst particles.

In another embodiment, the fluidization is carried out in such a way that the expansion of the catalyst bed and the increase in the space between the catalyst particles remain low. This provides the catalyst particles with a certain degree of movement. However, there should be no macroscopic mixing of the catalyst bed. This is achieved by fluidizing the catalyst bed at the fluidizing point. In a fluidized bed beyond the fluidizing point, for instance in an expanded fluidized bed, there is macroscopic mixing.

In both embodiments, the fluidization of the catalyst is carried out in such a way that no significant amounts of catalyst are discharged from the polymerization reactor. This behavior is achieved by a suitably selected flow rate through the catalyst bed. The optimal flow rate, expressed, for example, by the superficial velocity, has to be adapted to the desired embodiment of the invention (expanded fluidized bed or fluidized bed at the fluidizing point), the viscosity and density of the reaction medium and also the properties of the catalyst particles, in particular, their size, shape, density and porosity.

Too low a superficial velocity leads to a loss of fluidization. The achievement of the superficial velocity necessary for minimal fluidization achieves lasting dissolution and formation of solid contacts which are characteristic of a fluidized bed at the fluidizing point. An increase in the superficial velocity leads to an increase in the distance between the particles and also to higher movement of the particles and therefore to macroscopic mixing of the catalyst bed (expanded fluidized bed). Excessively high superficial velocities eventually lead to a massive discharge of catalyst particles out of the reactor with the reaction medium.

Higher viscosities of the reaction medium, smaller catalyst particles and also smaller density differences between catalyst particle and reaction medium result in lower superficial velocities for the process according to the invention, and vice versa. The appropriate relationships are known to those skilled in the art and are described, for example, in P. Zehner, Chem. Eng. Process., 19 (1985), 57-65.

The optimum parameters for the process according to the invention at the fluidizing point may be determined theoretically or experimentally. A useful experimental process for finding the desired fluidizing point is the analysis of the pressure drop over the catalyst bed as a function of the superficial velocity. When the superficial velocities are too low, the pressure drop rises continuously with the flow rate, corresponding to the conditions in a fixed bed; the bed is not yet in the fluidized state. In contrast, above the fluidization point sought (minimal fluidization rate), the rise of the pressure drop is distinctly smaller or it remains constant.

A measure of the presence of a fluidized bed at the fluidizing point or of an expanded fluidized bed is the expansion factor of the catalyst bed, i.e. the ratio of the volume taken up by the fluidized catalyst bed to the volume of the catalyst bed without flow-through.

In the case of a fluidized bed at the fluidizing point, this factor is $\leq 1.15$; preferably <1.10 and more preferably <1.05. The volume of the reaction zone filled by catalyst particles during flow-through with reaction medium is thus greater by max. 15%, preferably max. 10%, particularly preferably max. 5%, than the state without flow-through.

Suitable operating points for the process according to the invention with the formation of an expanded fluidized bed are at superficial velocities distinctly beyond the fluidizing point. These operating points lead to expansion factors of from 1.01 to 4; preferably from 1.05 to 2 and more preferably from 1.1 to 1.5 (ratio of the volume taken up by the fluidized catalyst bed to the volume of the catalyst bed without flow-through). The volume of the reaction zone filled by catalyst particles during flow-through with reaction medium is thus greater by from 1 to 300%, preferably from 5 to 100%, more preferably from 10 to 50%, than the state without flow-through.

The process according to the invention is operated using acidic heterogeneous catalysts which are suitable for polymerizing THF and are based on activated sheet silicates or mixed metal oxides. In a preferred embodiment of the present invention, the sheet silicate or metal oxide comprises at least one oxide from the group of $SiO_2$, $TiO_2$ and/or $ZrO_2$. Greater preference is given to systems based on acid-activated montmorillonites, and also based on $Al_2O_3/SiO_2$, $ZrO_2/SiO_2$, $WO_x/TiO_2$ and $WO_x/ZrO_2$ Particular preference is given to systems based on acid-activated montmorillonite and also based on $Al_2O_3/SiO_2$, $ZrO_2/SiO_2$.

All of the abovementioned catalyst systems may comprise one or more of the active components specified.

"$WO_x$" means a tungsten oxide which may have different stoichiometries varying between the extremes of $WO_2$ and $WO_3$ (x=from 2 to 3).

According to the invention, the term "catalysts based on activated sheet silicates or mixed metal oxides" preferably does not encompass any zeolites or heterpolyacids, which are preferably not used as catalysts in the present invention.

Depending on the catalyst, the polymerization reactor is operated by a liquid phase method or trickle method. In the case of the catalysts according to the invention which have a higher specific gravity compared to the reaction medium, the reaction mixture flows through the reactor from bottom to top. Preference is given to using the catalysts in the liquid phase method. The density determined by pycnometry of the preferred types of catalyst is from 1.5 to 10 g/cm³, preferably from 2 to 7 g/cm³, in particular from 2 to 4 g/cm³. The porosity (water takeup) of the preferred catalysts is from 0.05 to 5 cm³/g, preferably from 0.1 to 2 cm³/g, more preferably from 0.2 to 1.5 cm³/g.

The catalyst may be introduced into the polymerization reaction in powder form or preferably as a shaped body. Shaped bodies may be produced from pulverulent raw materials by methods known to those skilled in the art, for example tableting, agglomeration or extrusion, as described, inter alia, in Handbook of Heterogeneous Catalysis, Vol. 1, VCH Verlagsgesellschaft Weinheim, 1997, p. 414-417. In the shaping, assistants known to those skilled in the art, such as binders, lubricants and/or solvents may be added. The catalyst may be used for the polymerization, for example, in the form of cylinders, extrudates, ribbed extrudates, spheres, rings or spall. Preference is given to using spheres, spheroidal shaped bodies or spall.

The particle size of the catalyst may be varied within wide limits depending on the reaction conditions and catalyst type. Typically, the individual catalyst particles have a volume of from 500 µm³ to 5 cm³, preferably from 0.0005 mm³ to 1000 mm³, more preferably from 0.01 to 100 mm³ and in particular from 0.1 to 30 mm³. The bed density of the catalyst is from 250 to 2500 g/l, preferably from 400 to 2000 g/l.

The catalyst used according to the invention may optionally be pretreated. An example of a useful pretreatment is drying using gases, e.g. air or nitrogen, heated to from 80 to 200° C., preferably to from 100 to 150° C.

Useful telogens for the one-stage polymerization which is not preferred according to the invention are water, 1,4-butanediol and low molecular weight PTHF.

For the preferred preparation of PTHF esters (two-stage process), useful telogens are carboxylic anhydrides and/or carboxylic anhydride/carboxylic acid mixtures. Among these, preference is given to aliphatic and aromatic poly- and/or monocarboxylic acids or their anhydrides, each of which contain from 2 to 12 carbon atoms. Examples of preferred telogens are acetic anhydride, propionic anhydride, succinic anhydride and maleic anhydride, optionally in the presence of the corresponding acids. A preferred telogen is in particular acetic anhydride.

The PTHF carboxylates resulting form the use of the preferred telogens can be converted to PTHF, for example by the process described in U.S. Pat. No. 4,460,796.

Other copolymers of THF can be prepared by the additional use as comonomers of cyclic ethers which can undergo ring-opening polymerization, preferably three-, four- and five-membered rings, such as 1,2-alkylene oxides, e.g. ethylene oxide or propylene oxide, oxetane, substituted oxetanes, such as 3,3-dimethyloxetane, and also THF derivatives such as 3-methyltetrahydrofuran, 3,3-dimethyltetrahydrofuran or 3,4-dimethyltetrahydrofuran, and particular preference is given to 3-methyltetrahydrofuran.

The telogen and any comonomer are advantageously fed to the polymerization dissolved in THF. Since the telogen leads to chain termination or to chain transfer in the polymerization, the average molecular weight of the polymer can be controlled via the amount of telogen used. The more telogen is present in the reaction mixture, the lower the average molecular weight of the PTHF or of particular PHTF derivatives. Depending on the telogen content of the polymerization mixture, PTHF, the particular PTHF derivatives or THF copolymers may be prepared in a targeted manner with average molecular weights of from 250 to 10 000 dalton. Preference is given to using the process according to the invention to prepare PTHF, the particular PTHF derivatives or THF copolymers having average molecular weights of from 500 to 5 000 dalton, more preferably from 650 to 4 000 dalton.

The polymerization is generally carried out at temperatures of from 0 to 80° C., preferably from 25° C. to the boiling temperature of THF. The pressure applied is generally not critical for the result of the polymerization, and the working pressure is therefore generally atmospheric pressure or the autogenous pressure of the polymerization system. Exceptions to this are copolymerizations of THF with the volatile 1,2-alkylene oxides, which are advantageously performed under pressure. Typically, the pressure is from 0.1 to 20 bar, preferably from 0.5 to 2 bar.

The reactant mixture (feed) of THF and telogen and/or comonomer is fed to the polymerization reactor in an amount such that the catalyst hourly space velocity is from 0.01 to 3.0 kg of THF/kg of catalyst * h, preferably from 0.02 to 1.5 kg of THF/kg of catalyst * h and more preferably from 0.04 to 0.75 kg THF/kg of catalyst*h.

To avoid formation of ether peroxides, the polymerization is advantageously conducted under an inert gas atmosphere. Examples of useful inert gases include nitrogen, carbon dioxide and the noble gases, and preference is given to using nitrogen.

The polymerization reactor can be operated in straight pass, i.e. without product recycling, or with recirculation, i.e. a portion of the polymerization mixture leaving the reactor being recirculated.

The preferred recirculation method allows the superficial velocity suitable for fluidization of the catalyst to be adjusted in the reactor independently of the catalyst hourly space velocity. At the same time, the recirculation stream allows an efficient removal of the heat of reaction. The ratio of recirculation to feed is typically less than or equal to 200/1, and is preferably from 1/1 to 150/1 and more preferably from 5/1 to 100/1. For the preferred catalyst particles based on acid-activated montmorillonite, $Al_2O_3/SiO_2$, $ZrO_2/SiO_2$, $WO_x/TiO_2$ and/or $WO_x/ZrO_2$ having an individual particle volume of from 0.01 to 100 $mm^3$, the superficial velocity is from 0.1 to 200 $m^3/m^2 \cdot h$, preferably from 0.5 to 100 $m^3/m^2 \cdot h$.

The concentration of the carboxylic anhydride used as telogen in the reactant mixture (feed) fed to the polymerization reactor is from 0.03 to 30 mol %, preferably from 0.05 to 20 mol %, more preferably from 0.1 to 10 mol %, based on the THF used.

When a carboxylic acid is used in addition, the molar ratio in the feed is typically from 1:20 to 1:20 000, based on carboxylic anhydride used.

When comonomers are used in addition, the molar ratio in the feed is typically from 0.1 to 50 mol %, preferably from 0.5 to 40 mol %, more preferably from 1 to 30 mol %, based on THF used.

The polymerization reaction can be carried out in reactor types known to those skilled in the art, and preference is given to shaft reactors. The ratio of height to diameter may be adapted to the desired reaction conditions (superficial velocities) over a wide range. Enlargement of the reactor diameter in the region of the reactor exit may lead to a reduced flow rate in this region and therefore to reduced catalyst discharge. In order to achieve uniform fluidization of the catalyst, a suitable distributor tray at the reactor entrance is advantageous, e.g. a perforated screen or slot screen or slot nozzles on a support plate, and the reactor may also contain internals for heat removal.

The polymerization reactor can be started up using the above-described reactant mixture. Preference is given to starting up the reaction in accordance with DE 102 42 286 using a mixture of polytetrahydrofuran, the mono- or diesters of polytetrahydrofuran and/or of tetrahydrofuran copolymers, tetrahydrofuran, any comonomer and at least one carboxylic acid and/or one carboxylic anhydride. This preferred startup method reduces the changes in temperature and viscosity of the reaction solution occurring during the startup phase and thus eases the attainment of the fluidization state of the catalyst according to the invention.

To work up the polymerization effluent, it may be necessary to remove from the polymerization mixture the catalyst attritus which occurs in small amounts and is discharged from the reactor, for example by filtration or centrifugation, before the polymerization effluent obtained is fed to further workup.

The process according to the invention allows in an advantageous and simple manner the removal of catalyst from the reactor during the reaction or addition of fresh catalysts. The process according to the invention may therefore also be advantageously operated with catalysts whose use in a fixed bed is uneconomic owing, for example, to relatively rapid deactivation. A suitably adjusted, continuous exchange of the catalyst therefore allows the performance of the catalyst used in the reaction to be kept constant over periods which are virtually as long as desired.

The catalyst can be exchanged either continuously or else at regular intervals or batchwise. It is advantageous in the process according to the invention to carry out the catalyst exchange without emptying the reactor and/or interrupting the polymerization reaction. For the introduction and discharge of the catalyst, apparatus known to those skilled in the art is suitable.

In the case of the embodiment as an expanded fluidized bed, lock systems, for example, are suitable. Suitable positioning of the discharge apparatus advantageously allows larger or smaller catalyst particles to be preferentially removed from the system. In the case of catalyst particles having a higher specific gravity, smaller attrition or decomposition products, for example, collect preferably in the upper region of the reaction volume taken up by the catalyst and may be removed there.

In the case of the embodiment of operation at the fluidizing point, examples of useful systems in addition to lock systems include screw systems such as rabbling machines having conveying screws. Since the macroscopic mixing of the catalyst bed is low, the portions of the catalysts having the longest residence time in the reactor may be removed in a targeted manner. In the case of catalyst particles having a higher specific gravity, fresh catalyst may be added to the catalyst bed, while used catalyst may be removed at the bottom of the catalyst bed, which is also referred to as the moving bed method.

The particularly preferred PTHF acetate or THF copolymer acetates may be worked up by methods known per se. For example, after distillative removal of unconverted THF and then acetic anhydride, acetic acid and comonomer, the PTHF acetate or THF copolymer acetate obtained may be transesterified using methanol under base catalysis to give PTHF or THF copolymer and methylacetate.

If desired, low molecular weight PTHF and/or tetrahydrofuran copolymer of an average molecular weight from 200 to 700 dalton may subsequently be removed distillatively. Customarily, low molecular weight cyclic oligomers may also be removed distillatively. The distillation residue which remains is PTHF or THF copolymer having average molecular weights of from 650 to 10 000 daltons.

After use, the catalysts according to the invention may be regenerated continuously or batchwise, for example by thermal treatment, as described in EP-A 0 535 515, and/or by washing the catalyst with aqueous and/or organic solvents.

The invention is illustrated by the examples which follow.

EXAMPLE

An acid-activated sheet silicate (bleaching earth K10, Süd-chemie) was intensively kneaded in a laboratory kneader with water for 30 min, subsequently extruded to extrudates of diameter 4 mm, dried and calcined at 350° C. The extrudates were comminuted and a spall fraction of from 1.0 to 1.5 mm was screened out.

A cylindrical 500 ml reactor (cross-sectional area 24.4 $cm^2$) is charged with 50 ml steel spheres of diameter approx. 2 mm and 170 ml of the catalyst predried at 140° C. The reactor is subsequently heated to approx. 40° C. and charged from below with a mixture containing approx. 63% by weight of polytetrahydrofuran diacetate of average molar mass (Mn) of approx. 1600 g/mol, 35% by weight of tetrahydrofuran and 2% by weight of acetic anhydride. The liquid flowing out at the top of the reactor is fed back to the bottom of the reactor using a circulation pump. At a rate of circulation by pumping of approx. 7 to 8 l/h corresponding to a superficial velocity of approx. 3 m/h, a stable fluidized bed having a catalyst expansion of approx. 230 ml (determined without steel spheres) forms.

In addition, 17 g/h of a mixture of tetrahydrofuran (96.5% by weight) and acetic anhydride (3.5% by weight) are subsequently fed into the reactor, and a comparable stream is removed from the pumping circuit at the top of the reactor. The expansion of the fluidized catalyst bed is maintained at approx. 230 ml by closed-loop control of the rate of circulation by pumping. To work up the PTHF diacetate, the resulting reaction mixture is freed distillatively of unconverted THF and acetic anhydride. After the steady state is attained after approx. two days of running time, the evaporation rate is approx. 60% and the molecular weight Mn of the PTHF diacetate is approx. 1800 g/mol.

We claim:

1. A process for preparing polytetrahydrofuran, polytetrahydrofuran copolymer, polytetrahydrofuran diester or polytetrahydrofuran monoester in a polymerization reactor by polymerizing tetrahydrofuran in the presence of at least one telogen and/or comonomer and of an acidic heterogeneous catalyst, not encompassing heteropolyacids, and based on activated sheet silicates or mixed metal oxides in a fluidized catalyst bed at temperatures from 0 to 80° C., wherein the fluidized bed is operated at the fluidizing point with an expansion factor of the catalyst bed being less than or equal to 1.15 or wherein the fluidized bed is operated as an expanded fluidized bed with the expansion factor of the catalyst bed being from 1.01 to 4, wherein the fluidization is carried out such that no significant amounts of catalyst are discharged from the polymerization reactor, and wherein the reactor is operated in circulation and the ratio of circulation to feed is less than or equal to 200/1.

2. The process as claimed in claim 1, wherein the fluidized bed is operated at the fluidizing point with the expansion factor of the catalyst bed being less than or equal to 1.10.

3. The process as claimed in claim 1, wherein the expanded fluidized bed is operated at the fluidizing point with the expansion factor of the catalyst bed being from 1.05 to 2.

4. The process as claimed in claim 1, wherein the catalyst used comprises at least one oxide selected from the group consisting of $SiO_2$, $TiO_2$, and $ZrO_2$.

5. The process as claimed in claim 4, wherein the catalyst is based at least on one material selected from the group consisting of acid-activated montmorillonite, $Al_2O_3/SiO_2$, $ZrO_2/SiO_2$, $WO_x/TiO_2$, and $WO_x/ZrO_2$, wherein x is from 2 to 3.

6. The process as claimed in claim 1, wherein the catalyst used has a pycnometric density of from 1.5 to 10 $g/cm^3$.

7. The process as claimed in claim 1, wherein a porosity of the catalyst is from 0.05 to 5 $cm^3/g$.

8. The process as claimed in claim 1, wherein the catalyst particles have a volume of from 500 $\mu m^3$ to 5 $cm^3$.

9. The process as claimed in claim 1, wherein a bed density of the catalyst is from 250 to 2500 g/l.

10. The process as claimed in claim 1, wherein the reactor is flowed through from bottom to top.

11. The process as claimed in claim 1, wherein the catalyst or portions of the catalyst volume are withdrawn from and/or fed to the polymerization reactor continuously, at regular intervals or batchwise, without the reactor being emptied and/or the polymerization reaction being interrupted for this purpose.

12. The process as claimed in claim 1, wherein tetrahydrofuran is polymerized in the presence of carboxylic anhydride to give polytretrahydrofuran or derivatives and copolymers thereof having molecular weights of from 250 to 10,000 dalton.

13. The process as claimed in claim 12, wherein the carboxylic anhydride is acetic anhydride.

14. The process as claimed in claim 1, wherein a catalyst hourly space velocity is from 0.01 to 3.0 kg of THF/kg of catalyst per hour.

15. The process as claimed in claim 1, wherein a superficial velocity is from 0.1 to 200 $m^3/m^2$ per hour.

16. The process as claimed in claim 6, wherein the catalyst used has a pycnometric density of from 2 to 7 $g/cm^3$.

17. The process as claimed in claim 7, wherein the porosity of the catalyst is from 0.1 to 2 $cm^3/g$.

18. The process as claimed in claim 17, wherein the porosity of the catalyst is from 0.2 to 1.5 $cm^3/g$.

* * * * *